(12) United States Patent
Lawson

(10) Patent No.: US 12,153,257 B2
(45) Date of Patent: Nov. 26, 2024

(54) METHOD AND SYSTEM FOR MEASUREMENT OF FIBER CURVATURE

(71) Applicant: RAM Photonics Industrial, LLC, Webster, NY (US)

(72) Inventor: Joseph Lawson, Rochester, NY (US)

(73) Assignee: RAM Photonics Industrial, LLC, Webster, NY (US)

(*) Notice: Subject to any disclaimer, the term of this patent is extended or adjusted under 35 U.S.C. 154(b) by 201 days.

(21) Appl. No.: 17/733,332

(22) Filed: Apr. 29, 2022

(65) Prior Publication Data

US 2022/0350092 A1 Nov. 3, 2022

Related U.S. Application Data

(60) Provisional application No. 63/246,849, filed on Sep. 22, 2021, provisional application No. 63/181,873, (Continued)

(51) Int. Cl.
  *G02B 6/255* (2006.01)
  *G02B 6/42* (2006.01)

(52) U.S. Cl.
  CPC ......... *G02B 6/2555* (2013.01); *G02B 6/4206* (2013.01); *G02B 6/4214* (2013.01); *G02B 6/4221* (2013.01); *G02B 6/4227* (2013.01)

(58) Field of Classification Search
  CPC .. G02B 6/2555; G02B 6/4206; G02B 6/4214; G02B 6/4221; G02B 6/4227; G02B 6/024
  See application file for complete search history.

(56) References Cited

U.S. PATENT DOCUMENTS

| | | | | |
|---|---|---|---|---|
| 4,651,343 A | * | 3/1987 | Laor | ............... G02B 6/3508 |
| | | | | 385/33 |
| 6,052,505 A | * | 4/2000 | Bice | ............... G02B 6/3636 |
| | | | | 385/136 |

(Continued)

FOREIGN PATENT DOCUMENTS

EP 1026475 A1 * 8/2000 ........... G01B 11/255

OTHER PUBLICATIONS

PCT/US2022/026953, "International Preliminary Report on Patentability", Nov. 9, 2023, 5 pages.

(Continued)

*Primary Examiner* — Tarifur R Chowdhury
*Assistant Examiner* — Akbar H. Rizvi
(74) *Attorney, Agent, or Firm* — KILPATRICK TOWNSEND & STOCKTON LLP

(57) ABSTRACT

Various embodiments and methods relating to an optical fiber curvature measurement system are described herein. The optical fiber curvature measurement system includes a controller and a rotation stage. The rotation stage includes a central axis, a first end, and a second end. The central axis extends from the first end to the second end of the rotation stage. The rotation stage includes an optical fiber channel extending from the first end of the rotation stage to the second end of the rotation stage. The rotation stage is operationally coupled with the controller and configured to rotate about the central axis of the rotation stage. An optical fiber may be positioned within the optical fiber channel. The optical fiber curvature measurement system also includes a light source positioned to emit light onto the optical fiber channel at an oblique angle from the central axis of the rotation stage.

20 Claims, 10 Drawing Sheets

Related U.S. Application Data filed on Apr. 29, 2021, provisional application No. 63/181,869, filed on Apr. 29, 2021, provisional application No. 63/181,870, filed on Apr. 29, 2021.

(56) References Cited

U.S. PATENT DOCUMENTS

| | | | |
|---|---|---|---|
| 9,057,838 B2 | 6/2015 | Howell | |
| 2011/0026896 A1* | 2/2011 | Winberg | G02B 6/245 |
| | | | 385/137 |
| 2013/0100440 A1* | 4/2013 | Oyamada | G01B 11/255 |
| | | | 356/73.1 |
| 2016/0274299 A1* | 9/2016 | Li | G02B 6/024 |
| 2019/0265419 A1* | 8/2019 | Tayebati | H01S 3/23 |
| 2019/0278026 A1* | 9/2019 | Nishio | G02B 6/4296 |
| 2020/0064549 A1 | 2/2020 | Nishina et al. | |
| 2020/0064569 A1* | 2/2020 | Wigley | G02B 6/4213 |

OTHER PUBLICATIONS

Application No. PCT/US2022/026953, International Search Report and Written Opinion, Mailed On Jul. 29, 2022, 10 pages.

* cited by examiner

METHOD AND SYSTEM FOR MEASUREMENT OF FIBER CURVATURE

CROSS-REFERENCES TO RELATED APPLICATIONS

This application claims the benefit of U.S. Provisional Application No. 63/181,873, filed Apr. 29, 2021, U.S. Provisional Application No. 63/181,869, filed on Apr. 29, 2021, U.S. Provisional Application No. 63/246,849, filed on Sep. 22, 2021, and U.S. Provisional Application No. 63/181,870, filed on Apr. 29, 2021 which are hereby incorporated by reference in its entirety for all purposes.

BACKGROUND OF THE INVENTION

Polarization maintaining fibers have structures that support propagation of light in predetermined polarizations. When polarization maintaining fibers are spliced together or bonded to optical elements, the polarization maintaining fibers can be aligned during splicing and/or bonding.

Despite the progress made in the development of fiber alignment systems, there is a need in the art for improved methods and systems related to fiber alignment systems.

SUMMARY OF THE INVENTION

The present disclosure relates generally to methods and systems related to optical systems including optical fibers. More particularly, embodiments of the present invention provide methods and systems that can be used to measure the curvature or curl present in optical fibers including polarization maintaining fibers. This curvature information can be utilized in a variety of manners, including during fiber alignment and splicing. The disclosure is applicable to a variety of applications in lasers and optics, including fiber laser implementations.

Various embodiments and methods relating to an optical fiber curvature measurement system are described herein. The optical fiber curvature measurement system may include a controller and a rotation stage. The rotation stage may include a central axis, a first end, and a second end, wherein the central axis extends from the first end to the second end of the rotation stage. The rotation stage may include an optical fiber channel extending from the first end of the rotation stage to the second end of the rotation stage. The rotation stage may be operationally coupled with the controller and configured to rotate about the central axis of the rotation stage. An optical fiber may be positioned within the optical fiber channel. The optical fiber may include a cantilevered end extending out from the second end of the rotation stage. The optical fiber curvature measurement system may also include a light source positioned to emit light onto the optical fiber channel at an oblique angle from the central axis of the rotation stage and an image sensor positioned adjacent to the second end of the rotation stage. For example, the oblique angle may be less than 90° from the central axis of the rotation stage. The image sensor may be positioned to generate an initial image of the cantilevered end of the optical fiber disposed within the optical fiber channel. The image sensor may be operationally coupled with the controller.

In some embodiments, the optical fiber curvature measurement system may include a static immobilizer. The static immobilizer may be in contact with a portion of the optical fiber and is configured to secure the optical fiber onto the rotation stage. Optionally, the static immobilizer may be positioned between the rotation stage and the image sensor. In examples, the static immobilizer may include a vacuum chuck. In some cases, the rotation stage includes a drive assembly and a rotator assembly. In examples, the optical fiber curvature measurement system includes mechanical immobilizer configured to secure the optical fiber when the rotation stage rotates about the central axis of the rotation stage. For example, the mechanical immobilizer includes two pads positioned on either side of the optical fiber channel and configured to contact the optical fiber when positioned in the optical fiber channel. In some cases, the mechanical immobilizer is positioned between the rotation stage and the static immobilizer. In some embodiments, the optical fiber may include one or more stress rods.

A method of determining a curvature of an optical fiber is also described herein. The method may include placing an optical fiber having a cantilevered end on a rotation stage and securing the optical fiber on the rotation stage. In examples, the method includes collecting a plurality of images associated with a different rotational position of the cantilevered end of the optical fiber. The method may also include determining that the plurality of images is at a threshold. A deflection of the cantilevered end of the optical fiber may be calculated based on the plurality of images associated with a different rotational position of the cantilevered end of the optical fiber. A radius of curvature of the optical fiber may be computed based on the deflection of the cantilevered end of the optical fiber.

In some embodiments, computing the radius of curvature of the optical fiber may include determining a cantilevered length of the cantilevered end of the optical fiber. In examples, collecting the plurality of images may include illuminating the optical fiber on the rotation stage, generating a first image of an emission face of the cantilevered end of the optical fiber, and generating a second image of the emission face of the cantilevered end of the optical fiber. For example, generating the first image of the emission face of the cantilevered end of the optical fiber and generating the second image of the emission face of the cantilevered end of the optical fiber may include generating the first image of the emission face of the cantilevered end of the optical fiber in a first rotational position, rotating the optical fiber to a second rotational position, and generating the second image of the emission face of the cantilevered end of the optical fiber in the second rotational position. In some examples, illuminating the optical fiber on the rotation stage includes emitting light onto the optical fiber at an oblique angle from the optical fiber. Optionally, the method may also include generating a third image of the emission face of the cantilevered end of the optical fiber in a third rotational position.

In some embodiments, the method may also include determining that a number of the plurality of images is below a threshold number of images, rotating the optical fiber on the rotation stage to a next position, and collecting another image of the cantilevered end of the optical fiber in the next position. Optionally, prior to computing the radius of curvature of the optical fiber based on the plurality of images, the method may include determining that the number of the plurality of images is at the threshold number of images. In some cases, prior to rotating the optical fiber on the rotation stage to the next position, the method includes releasing the optical fiber. In some embodiments, securing the optical fiber on the rotation stage may include contacting the optical fiber with a vacuum chuck and inducing a vacuum on the optical fiber using the vacuum chuck.

Numerous benefits are achieved by way of the present disclosure over conventional techniques. For example, embodiments of the present disclosure, provide methods and systems for identifying and measuring the curvature, which can be referred to as the curl, of an optical fiber without the need for costly or complex illumination setups and techniques. In fact, these methods and systems allow for the identification of other features of the optical fiber, such as the core and/or stress rods, as well as measurement of the curvature of the optical fiber using a single device, increasing the efficiency of measurements and reducing the time required for identification.

Additionally, embodiments of the present invention are characterized by a wide tolerance range, thereby allowing for variation in approach without impacting the results. For example, a laser does not have to be precisely aligned with an axis of an optical fiber to accurately measure the fiber curvature. Instead, a light source may be applied within a wide range of angles. Moreover, these methods and systems are agnostic to the type of fiber, allowing for alignment of various types of fibers. These and other embodiments of the disclosure, along with many of its advantages and features, are described in more detail in conjunction with the text below and corresponding figures.

DETAILED DESCRIPTION OF SPECIFIC EMBODIMENTS

The present disclosure relates generally to methods and systems related to optical systems including optical fibers. More particularly, embodiments of the present invention provide methods and systems that can be used to measure the curvature present in an optical fiber. This curvature information can be utilized in a variety of manners, including during fiber splicing. The disclosure is applicable to a variety of applications in lasers and optics, including fiber laser implementations.

Figure 1A:
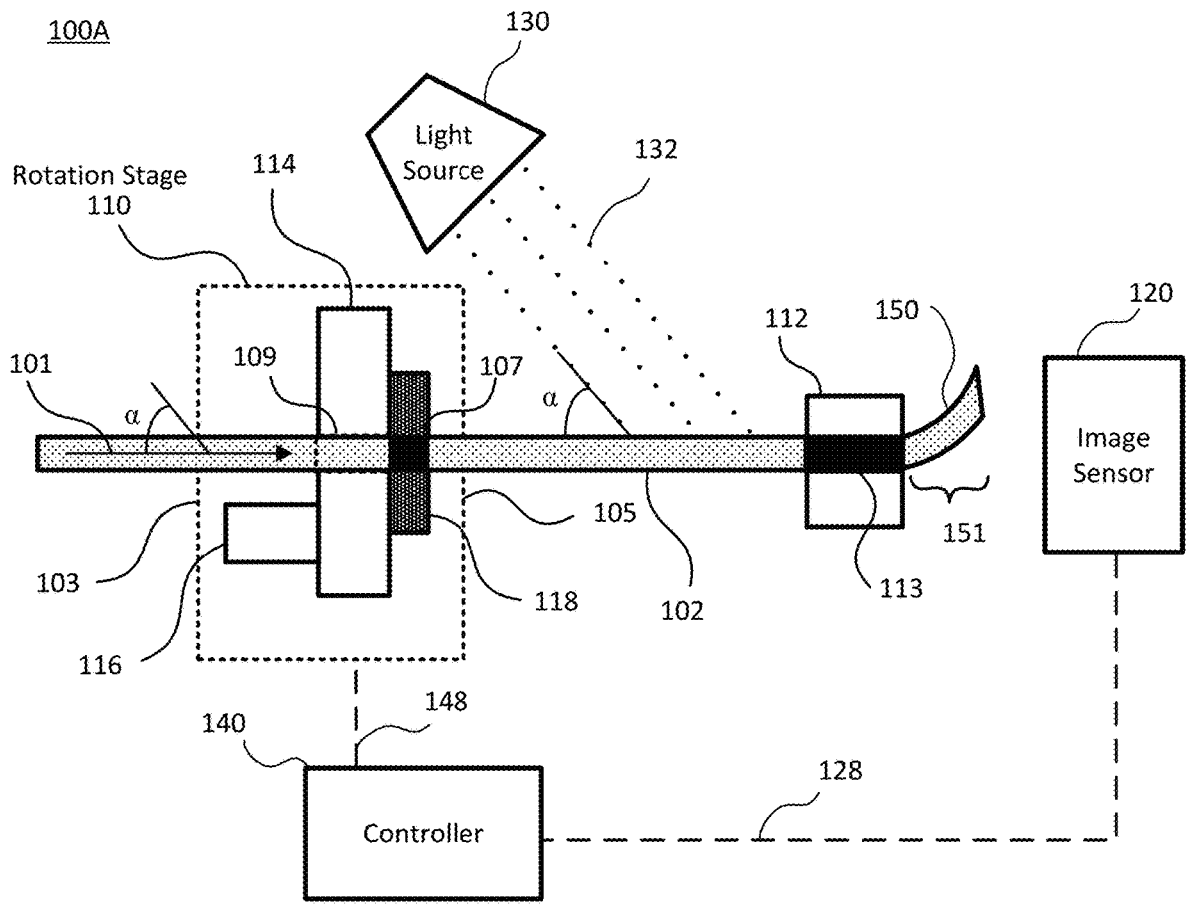
FIG. 1A is a simplified schematic diagram illustrating an optical fiber curvature measurement system according to an embodiment of the present invention.

FIG. 1A is a simplified schematic diagram illustrating an optical fiber curvature measurement system 100A according to an embodiment of the present invention. Optical fiber curvature measurement system 100A may include a rotation stage 110, an image sensor 120, a controller 140, and a light source 130. Rotation stage 110 may include a central axis 101, a first end 103, and a second end 105. The central axis 101 may extend from the first end 103 to the second end 105 of rotation stage 110. Rotation stage 110 may be configured to rotate about the central axis 101. To facilitate rotation, rotation stage 110 may include a drive assembly 116 and a rotator assembly 114. Drive assembly 116 may include a motor that rotates the rotator assembly 114. Rotator assembly 114 may be part of rotation stage 110. Rotation stage 110 may be configured to receive a fiber, such as optical fiber 102.

Figure 1B:
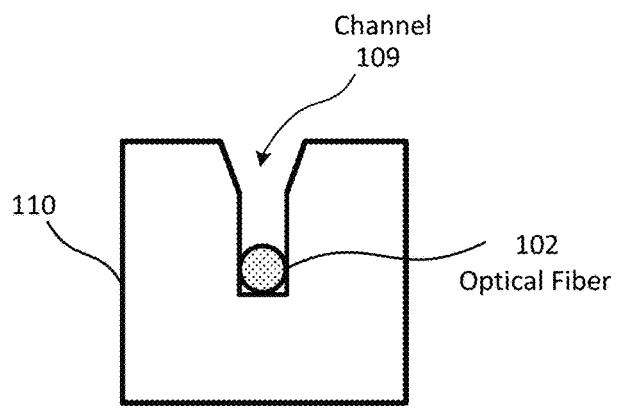
FIG. 1B is a simplified schematic diagram illustrating a front view of a portion of the optical fiber curvature measurement system illustrated in FIG. 1A.

FIG. 1B is a simplified schematic diagram illustrating a front view of a portion of the optical fiber curvature system illustrated in FIG. 1A, particularly, front view 100B of rotation stage 110. Front view 100B may be a face-on view of the second end of rotation stage 110. As shown, rotation stage 110 may include a channel 109. Channel 109 may be an optical fiber channel through which rotation stage 110 receives optical fiber 102. Channel 109 may extend from the first end 103 of rotation stage 110 to the second end 105 of rotation stage 110. In some embodiments, channel 109 may secure optical fiber 102 within rotation stage 110, at least during rotation of rotation stage 110 about central axis 101.

To secure optical fiber 102 during rotation of rotation stage 110, optical fiber curvature measurement system 100A may include a mechanical immobilizer 118. In some embodiments, as illustrated in FIGS. 1A and 1B, optical fiber 102 may extend out in a cantilevered fashion from channel 109 of rotation stage 110 toward image sensor 120. Mechanical immobilizer 118 may be positioned to contact a portion 107 of optical fiber 102 that extends from channel 109 toward image sensor 120. For example, mechanical immobilizer 118 may include two pads positioned on either side of optical fiber 102 that may contact optical fiber 102 during rotation. In some cases, mechanical immobilizer 118 may provide a compression force to optical fiber 102 to secure optical fiber 102 during rotation. Mechanical immobilizer 118 may be configured to secure optical fiber 102 in a fixed relationship with respect to rotation stage 110 when rotation stage 110 rotates about its central axis.

Optical fiber 102 may also be secured using static immobilizer 112 during imaging by image sensor 120. To secure optical fiber 102 within rotation stage 110 during imaging, optical fiber curvature measurement system 100A may include a static immobilizer 112. Static immobilizer 112 may be positioned to contact a portion of optical fiber 102. For example, static immobilizer 112 may be positioned between rotation stage 110 and image sensor 120 to receive a portion 113 of optical fiber 102 extending from channel 109 toward image sensor 120. Static immobilizer 112 may secure optical fiber 102 to rotation stage 110 when image sensor 120 generates an image of the emission face of optical fiber 102. For example, static immobilizer 112 may be a vacuum chuck. In some embodiments, mechanical immobilizer 118 may be positioned between rotation stage 110 and static immobilizer 112.

Image sensor 120 may be positioned to generate an image of the emission face of optical fiber 102 when optical fiber 102 is disposed within channel 109. In some embodiments, image sensor 120 may be positioned adjacent to the second end 105 of rotation stage 110. Image sensor 120 may include any sensor that is capable of sensing light emitted from the emission face of optical fiber 102. For example, image sensor 120 may be a camera.

Image sensor 120 may be operationally coupled with controller 140 via communication line 128. Rotation stage 110 may also be operationally coupled with controller 140 via communication line 148. In some embodiments, after image sensor 120 generates an image of the emission face of optical fiber 102, image sensor 120 may send the image to controller 140 via communication line 128. Controller 140 may perform various steps of the methods described herein. For example, controller 140 may determine a rotation angle for rotation stage 110 based on the image of the emission face received from image sensor 120. Controller 140 may communicate instructions for the rotation angle to rotation stage 110 via communication line 148. In response to receiving the instructions, rotation stage 110 may rotate to the rotation angle specified by controller 140. Although not shown, in some embodiments, controller 140 may also be operationally coupled with light source 130.

Light source 130 may be positioned to emit light 132 onto channel 109. If operationally coupled with controller 140, light source 130 may receive instructions for timing of emitting light 132. Light source 130 may be any suitable source of light including a laser, an light emitting diode (LED), an arc lamp, a fiber optic illuminator, an incandescent source, a fluorescent source, a phosphorescent source, or the like. Light source 130 may emit light 132 onto channel 109 at an emission angle α. The emission angle α may be an angle that is non-perpendicular to the central axis 101 of rotation stage 110 as illustrated in FIG. 1A. In some embodiments, the emission angle may be an oblique angle from the central axis of rotation stage 110. For example, the oblique angle may be less than 90°, less than 80°, less than 70°, less than 60°, less than 50°, less than 40°, less than 30°, less than 20°, or less than 10° from the central axis of rotation stage 110. As described more fully herein, the oblique angle facilitates optical coupling of emitted light 132 into optical fiber 102. The emission angle may not be congruent with channel 109. Thus, light 132 emitted by light source 130 onto channel 109 can be coupled into optical fiber 102.

As shown, optical fiber 102 may have a cantilevered end 150 that extends out in a cantilevered fashion in region 151 from rotation stage 110. For example, cantilevered end 150 of optical fiber 102 may extend out from channel 109 of rotation stage 110 toward image sensor 120. In some embodiments, as discussed above, cantilevered end 150 may curve as it extends from rotation stage 110. When light source 130 emits light 132 onto channel 109, light 132 may enter into and propagate along optical fiber 102.

As illustrated in FIG. 1A, cantilevered end 150 may have a curved region 151. Residual stress present in optical fiber 102 may result in curved region 151 of optical fiber 102 adjacent to the emission face of optical fiber 102 being characterized by curvature or other deflection. Residual stress may result from the fabrication process of the optical fiber during manufacturing or from the physical structure of the fiber, for example, residual stress present in a polarization maintaining fiber due to the stress rods utilized to implement polarization maintaining properties. In FIG. 1A, this curvature is represented as the optical fiber 102 curving up in curved region 151 so that the emission face is not disposed at a position along the central axis 101. Although the curvature is illustrated as a vertical curve in FIG. 1A, this particular curvature is not required by the present invention and the curvature could be down, in or out of the plane of the figure, combinations thereof, or the like. One of ordinary skill in the art would recognize many variations, modifications, and alternatives.

Figure 1C:
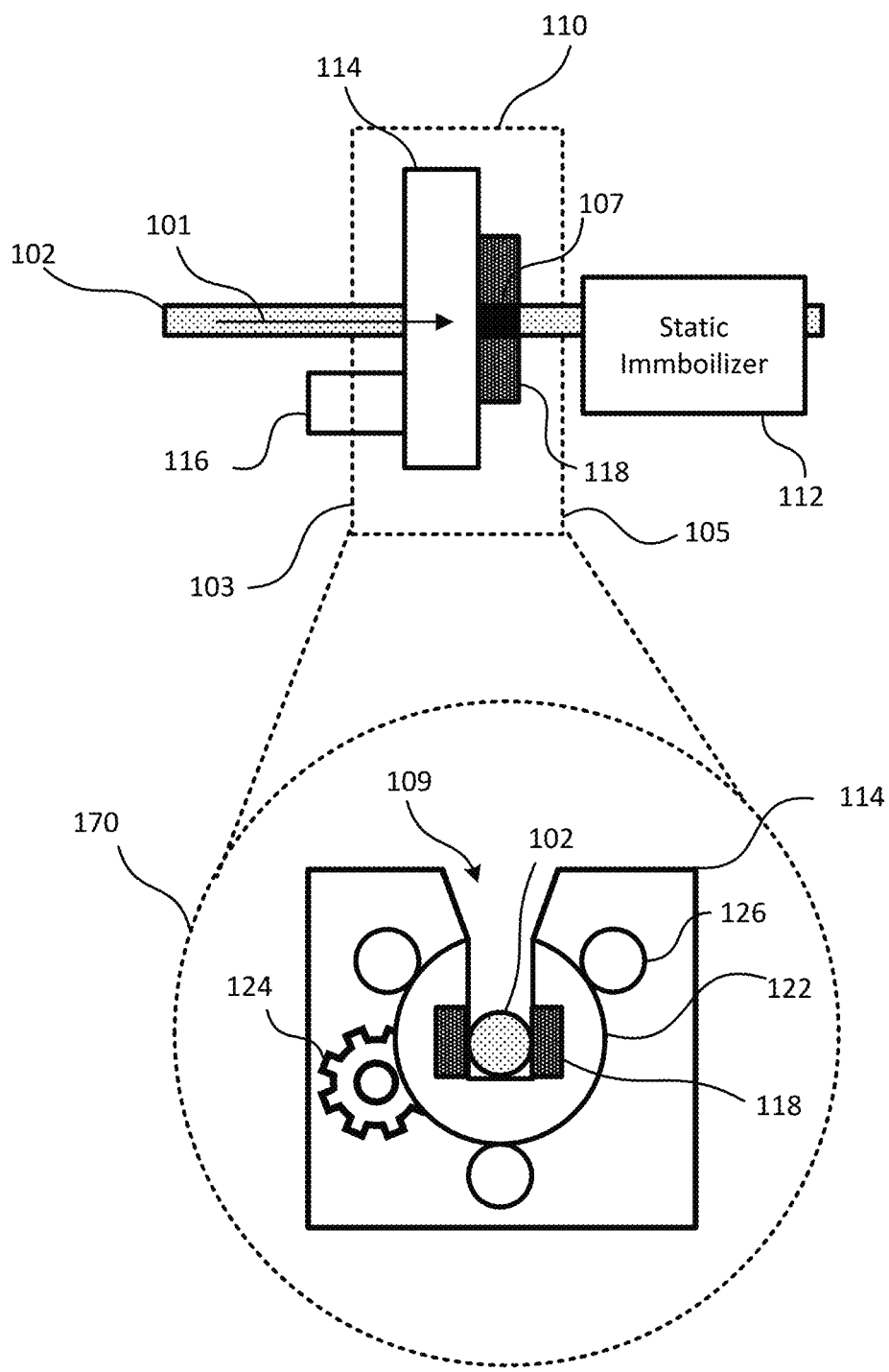
FIG. 1C is a simplified schematic diagram illustrating components of the rotation stage of the optical fiber curvature system illustrated in FIGS. 1A and 1B.

FIG. 1C provides a simplified schematic diagram 100C illustrating components of the rotation stage 110 of the optical fiber curvature system illustrated in FIG. 1A according to another example embodiment. As noted above, the rotation stage 110 may include the rotator assembly 114 and the drive assembly 116. As shown, the static immobilizer 112 may be positioned adjacent to rotation stage 110. A blowup view 170 of rotation stage 110 provides a front view facing towards rotation stage 110 as viewed from static immobilizer 112. Rotation stage 110 may be configured to receive an optical fiber 102. To receive optical fiber 102, rotation stage 110 may include the channel 109. Channel 109 may be an optical fiber channel through which rotation stage 110 receives optical fiber 102. Channel 109 may extend from a first end 103 of rotation stage 110 to a second end 105 of rotation stage 110. Channel 109 may extend parallel to a central axis 101 of rotation stage 110. As shown, optical fiber 102 may be disposed in channel 109.

As noted above, to secure optical fiber 102 during rotation of rotation stage 110, rotation stage 110 may include mechanical immobilizer 118. In some embodiments, optical fiber 102 may extend out in a cantilevered fashion from channel 109 of rotation stage 110, as illustrated in FIG. 1A. Mechanical immobilizer 118 may be positioned to contact the portion 107 of optical fiber 102 that extends outside channel 109. Mechanical immobilizer 118 may be configured to secure optical fiber 102 when rotation stage 110 rotates about central axis 101. For example, mechanical immobilizer 118 may include two pads positioned on either side of optical fiber 102 that may contact optical fiber 102 and mechanically constrain optical fiber 102 during rotation. Mechanical immobilizer 118 may maintain the physical position of optical fiber 102 while rotating optical fiber 102 about central axis 101. In other words, the coordinates of optical fiber 102 remain unchanged during rotation. In some cases, mechanical immobilizer 118 may provide a compression force to optical fiber 102 to secure optical fiber 102 during rotation. In some embodiments, mechanical immobilizer 118 may be positioned between rotation stage 110 and static immobilizer 112.

To rotate rotation stage 110, rotator assembly 114 may include a rotator hub 122, a drive sprocket 124, and one or more rollers 126. Drive assembly 116 may be mechanically coupled to rotator assembly 114 to rotate rotation stage 110. Specifically, drive assembly 116 may include a motor (not shown) that transfers rotational energy to drive sprocket 124, which in transfers the rotational energy to rotator hub 122 and rollers 126, thereby rotating optical fiber 102 in optical fiber channel 109.

Figure 1D:
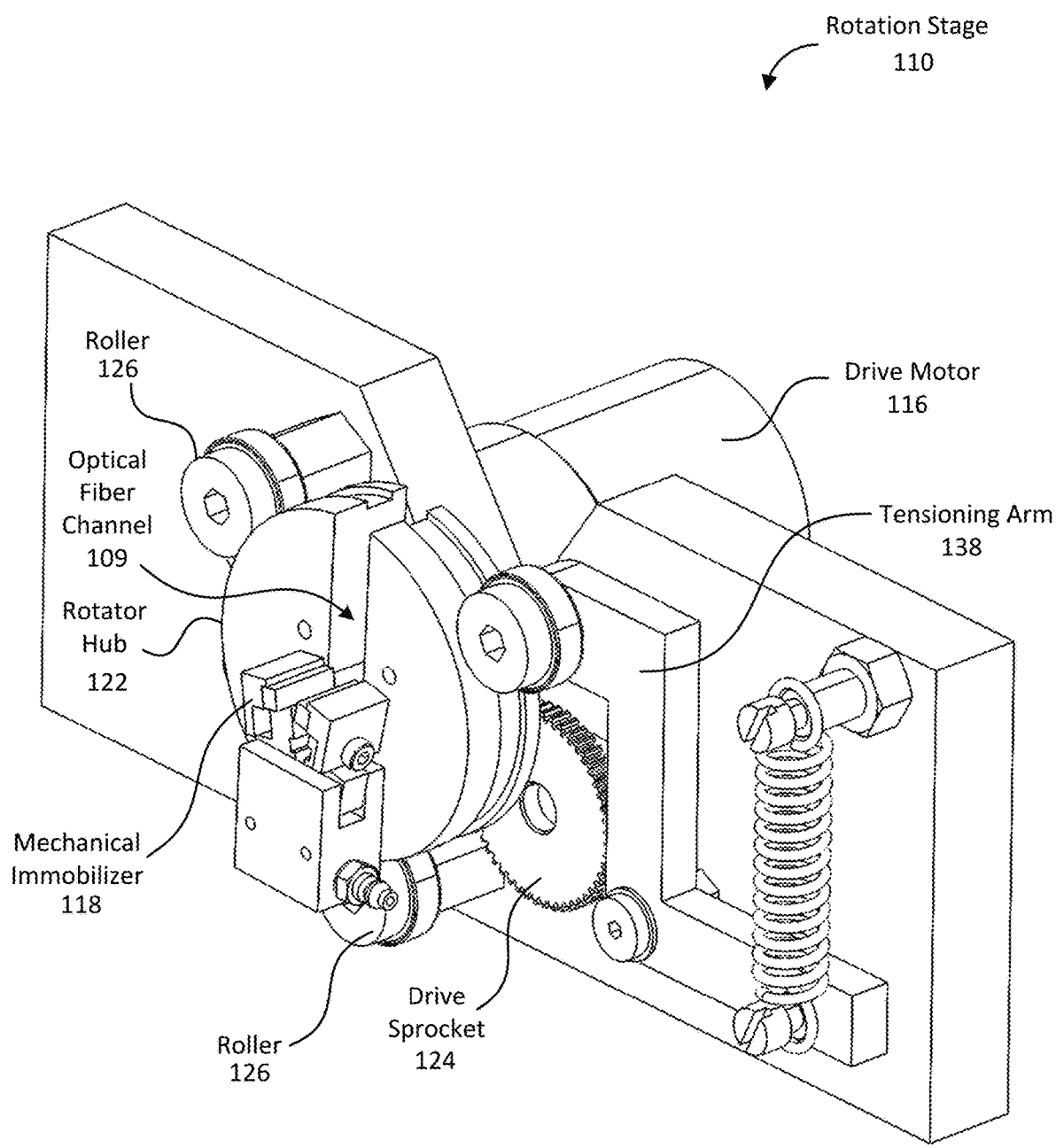
FIG. 1D is a schematic diagram illustrating the components of the rotation stage illustrated in FIGS. 1A-C.

FIG. 1D provides a more detailed schematic diagram illustrating the components of the rotation stage 110 illustrated in FIGS. 1A-C. FIG. 1D depicts an example embodiment of rotation stage 110. As shown, rotation stage 110 may include various components for rotating rotation stage 110. For example, rotation stage 110 may include the drive motor 116. Drive motor 116 may provide mechanical energy for rotating rotation stage 110. Drive motor 116 may be mechanically coupled with the drive sprocket 124. Drive sprocket 124 may, in turn, be mechanically coupled with one or more rollers 126. One or more rollers 126 may be positioned such to transfer rotational energy from drive sprocket 124 to a rotator hub 122. Rotator hub 122 may include an optical fiber channel 109 for disposing an optical fiber therein. The mechanical immobilizer 118 may be positioned adjacent to optical fiber channel 109 such to grasp or secure an optical fiber when disposed within optical fiber channel 109. Accordingly, when rotator hub 122 rotates, the optical fiber disposed within optical fiber channel 109 rotates along with rotator hub 122. In some embodiments, rotation stage 110 may include a tensioning arm 138. Tensioning arm 138 may cause one or more rollers 126 to apply friction to rotator hub 122. By applying tension to rotator hub 122, the speed and rotation angle of rotator hub 122 may be controlled in a precise manner.

Figure 1E:
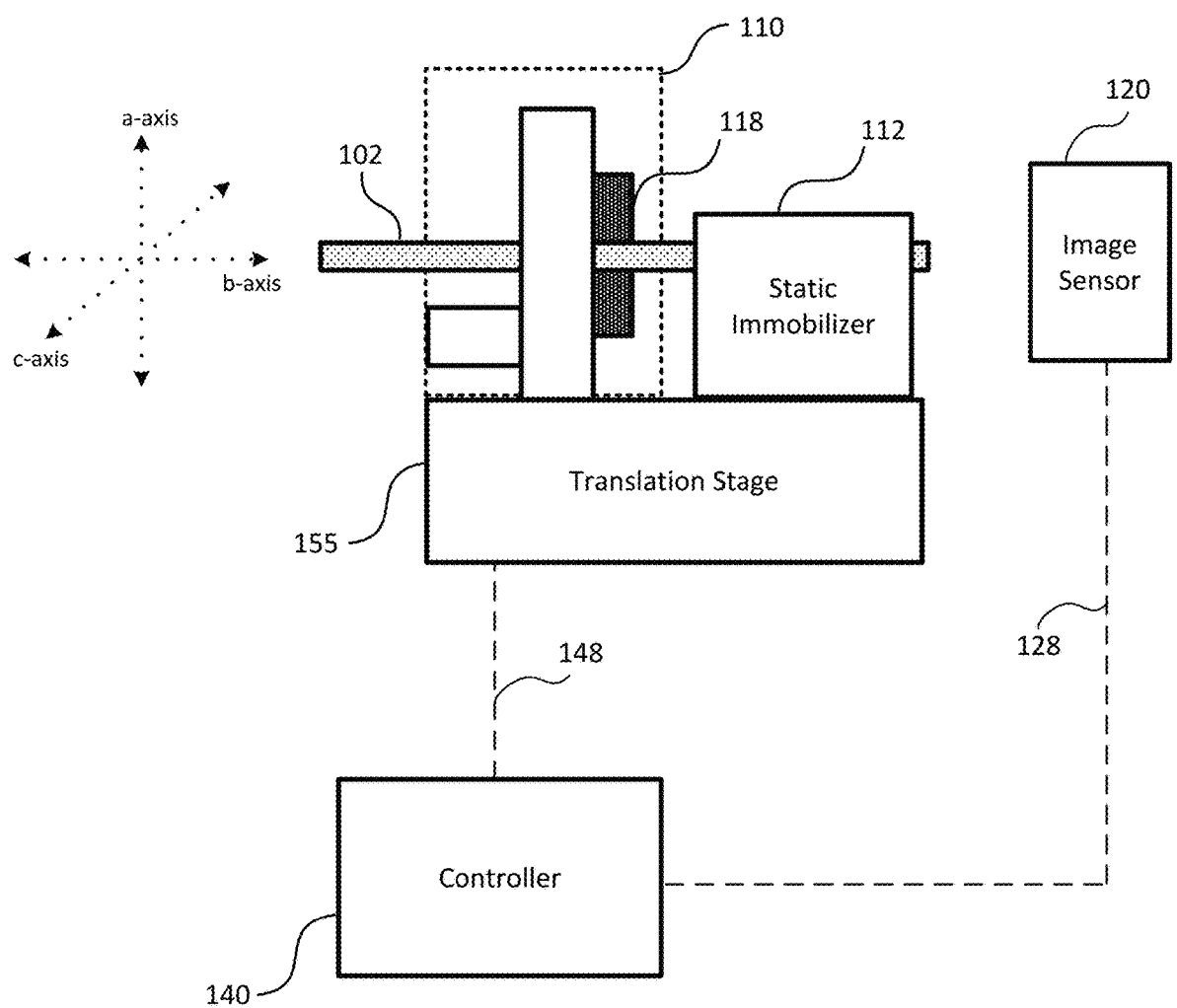
FIG. 1E is a simplified schematic diagram illustrating components of the rotation stage of the optical fiber curvature system illustrated in FIGS. 1A-D according to some embodiments.

In some embodiments, the optical fiber curvature system described herein may also include a translation stage. FIG. 1E provides a simplified schematic diagram illustrating components the optical fiber curvature systems illustrated in FIGS. 1A-D including a translation stage 155, according to some embodiments. Although, optical fiber curvature system 100E is depicted in this configuration, it should be understood that optical fiber curvature system 100E may be configured in other configurations, such as the optical fiber curvature system configurations depicted in FIGS. 1A-D.

In some cases, optical fiber 102 disposed within rotation stage 110 may need to be translated (i.e., the position of the optical fiber may be adjusted up/down or right/left in directions orthogonal to the axis of rotation) in addition to being rotated. For example, as shown, optical fiber 102 may be adjusted up or down along an a-axis, forward or backward with respect to the image sensor along a b-axis, and left or right along a c-axis. To align optical fiber 102 with an external body, optical fiber 102 may need to be adjusted along the a-axis, the b-axis, and/or the c-axis to align with one or more components of the external body. The a-axis, the b-axis, and the c-axis may correspond to a spatial y-axis, a spatial x-axis, and a spatial z-axis.

To translate optical fiber 102, optical fiber curvature system 100E may include translation stage 155. Translation stage 155 may be operationally coupled with rotation stage 110. In some embodiments, translation stage 155 may adjust rotation stage 110 along the a-axis and/or c-axis with relation to an external body (not shown). Translation stage 155 may also be positioned to adjust static immobilizer 112. The mechanical immobilizer 118 may be positioned between rotation stage 110 and static immobilizer 112.

Translation stage 155 may be operationally coupled with controller 140 via communication line 148. In an exemplary scenario, image sensor 120 may generate an image of an emission face of optical fiber 102 and transmit the image of the emission face to controller 140. Controller 140 may determine that optical fiber 102 has a translational offset. Based on the translational offset, controller 140 may transmit instructions to translation stage 155 via communication line 148 to translate optical fiber 102. Based on the instructions received from controller 140, translation stage 155 may adjust rotation stage 110 to translate optical fiber 102 accordingly. For example, translation stage 155 may raise or lower rotation stage 110. In some cases, translation stage 155 may adjust rotation stage 110 from side-to-side. Although not shown, translation stage 155 may include a mechanical or motorized means of moving rotation stage 110.

It should be appreciated that the optical fibers discussed herein, such as optical fiber 102, may be rotated and translated simultaneously or concurrently. In other cases, rotation and translation of an optical fiber may be done sequentially or at different stages of an alignment process.

Figure 2A:
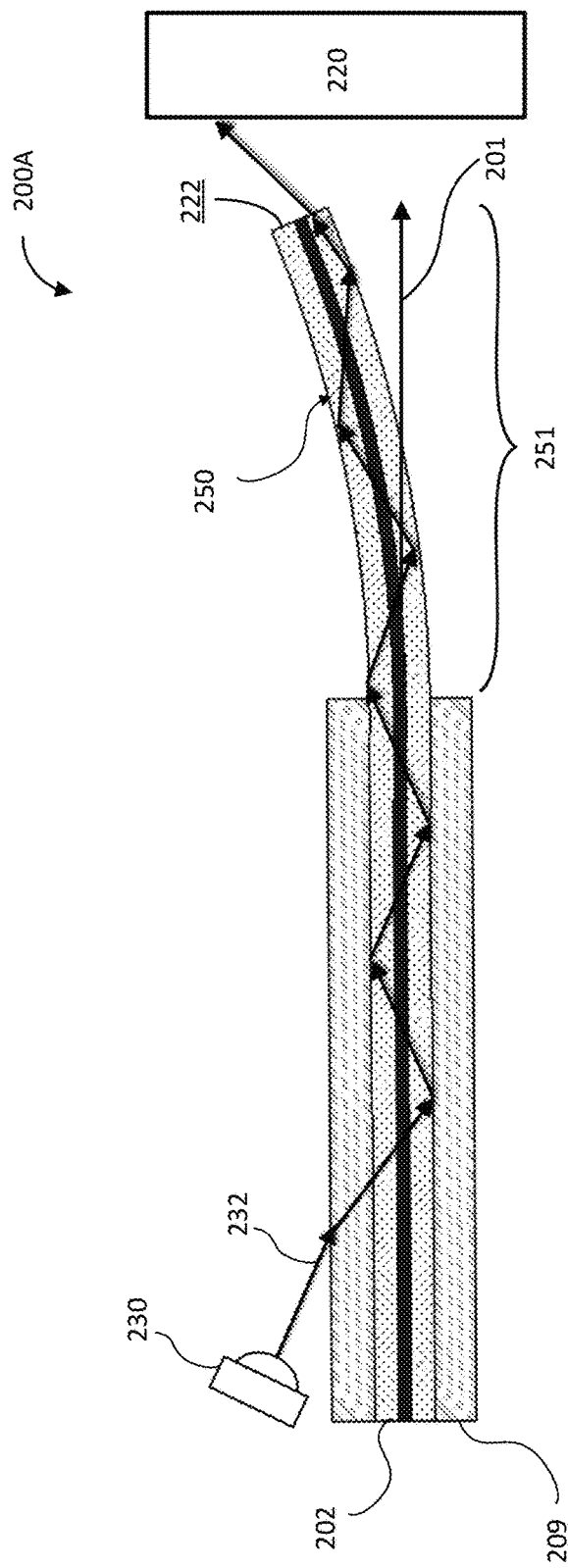
FIG. 2A is a simplified schematic diagram illustrating components of the optical fiber curvature measurement system illustrated in FIG. 1A.

FIG. 2A is a simplified schematic diagram illustrating components of the optical fiber curvature measurement system illustrated in FIG. 1A. As illustrated in FIG. 2A, schematic side view 200A of light emission onto and through an optical fiber 202 is shown. Optical fiber 202 may be the same as optical fiber 102, and disposed in an optical fiber channel 209. Light source 230, which may be the same as light source 130, may emit light 232 that is incident on optical fiber 202.

As shown in FIG. 2A, light 232 coupled into optical fiber 202 from the side of optical fiber 202 propagates in optical fiber after entry. In contrast with some techniques for coupling light into an optical fiber, embodiments of the present invention provide methods and systems that couple light into the optical fiber with improved tolerance metrics because of the large range of oblique angles that can be utilized.

As will be evident to one of skill in the art, for a polarization maintaining fiber, if the polarization state of light propagating in the polarization maintaining fiber is aligned either parallel to or perpendicular to the axis passing through the stress rods, then the polarization state of light propagating in the polarization maintaining fiber will be maintained as light propagates through the polarization maintaining fiber. Therefore, embodiments of the present invention provide methods and systems to determine the angular orientation of the optical fiber and, as a result, the polarization state of the light emitted from the polarization maintaining fiber.

Optical fiber 202 may include a cantilevered end 250. As discussed above, cantilevered end 250 may by characterized by an amount of curvature in curved region 251 where cantilevered end 250 extends from the rotation stage (not shown). The amount of curvature present in curved region 251 relates to the degree that cantilevered end 250 deflects away from a central axis 201 of optical fiber channel 209. Image sensor 220 may be positioned adjacent to the emission face 207 of cantilevered end 250 of optical fiber 202.

Figure 2B:
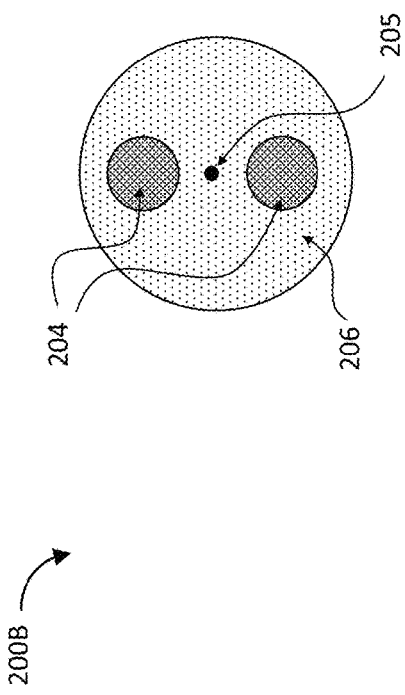
FIG. 2B is a diagram illustrating an image of an emission face of an optical fiber obtained using the optical fiber curvature measurement system illustrated in FIG. 2A.

FIG. 2B is a diagram illustrating an image of an emission face 200B of an optical fiber 202 obtained using the optical fiber curvature measurement system illustrated in FIG. 2A. As shown, optical fiber 202 may include a core 205, a pair of stress rods 204 disposed adjacent the core 205, and a cladding 206 surrounding the core and enclosing the pair of stress rods 204. In some embodiments, optical fiber 202 may include a buffer (not shown). A buffer may contain material that provides stress release to glass within optical fiber 202.

Image sensor 220 may be positioned to generate an image of the emission face of the optical fiber 202. Image sensor 220 may be the same as image sensor 120 and may generate an image of emission face 200B as viewed from a position adjacent the end of the optical fiber. In some embodiments, image sensor 220 may be be mounted to a linear translation stage (not shown) to improve focusing. In operation, light is coupled into the cladding of the optical fiber and propagates through the fiber, exiting at cleaved end 222 of the optical fiber 202. As the light exits the cleaved end 222 of the optical fiber 202, the exiting light can be imaged based on the portion of light 232 that exits the cleaved end 222 of the optical fiber 202. The image may show stress rods 204, core 205, and cladding 206 of optical fiber 202 as a result of the differing indices of refraction associated with stress rods 204, core 205, and cladding 206 of optical fiber 202. As described more fully herein, the contrast of the image can be high enough to identify stress rods 204, core 205, and cladding 206 of optical fiber 202. Thus, using embodiments of the present invention, the polarization axis of the optical fiber, which can be related to the angular positions of the stress rods, can be aligned with respect to a reference frame using the image that shows the various components of the optical fiber. It should be appreciated that while the following discussion relates to an optical fiber having two stress rods and a core, the presence of the stress rods, the number of stress rods, and the like may vary depending on the type of optical fiber.

It should be understood that the optical fiber curvature measurement system, and related methods, described herein may also be used for other types of fibers and/or configuration of stress rods, patterned microstructures, elements, keying features, and cores of fibers. In various embodiments of the systems and related methods, optical fiber 102 may be another type of fiber such as for bow-tie fibers, panda fibers, multi-core fibers, elliptical fibers, photonic crystal optical fibers, and the like. In such cases, the presence, arrangement, and/or orientation of stress rods 204, core 205, and cladding 206 may vary depending on the type of fiber present.

Figure 3:
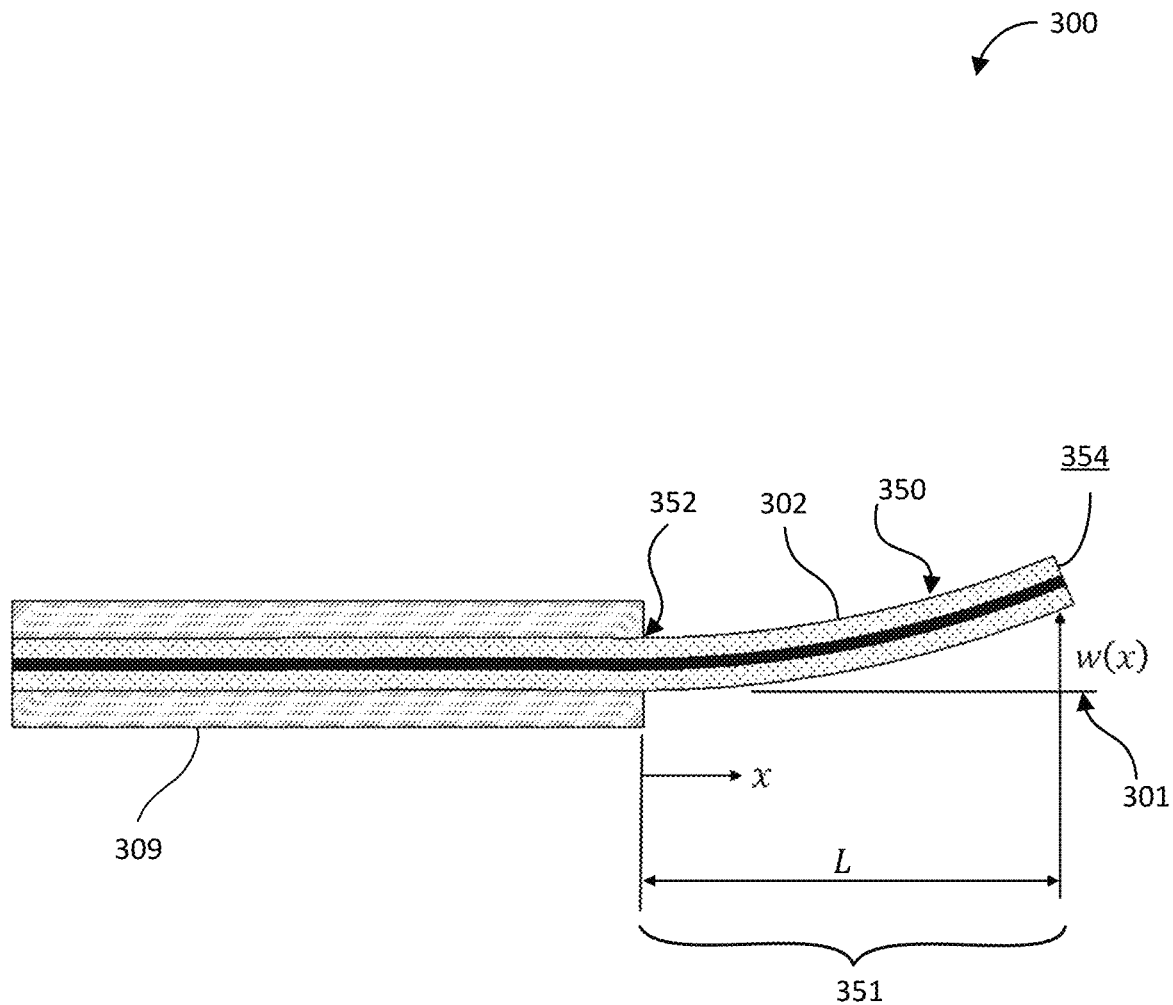
FIG. 3 is a simplified schematic diagram of an optical fiber with curvature according to an embodiment of the present invention.

FIG. 3 is a simplified schematic diagram 300 of an optical fiber 302 with curvature according to an embodiment of the present invention. Optical fiber 302 may include a cantilevered end 350. Cantilevered end 350 may include a region 351 of optical fiber 302 that extends from an optical fiber channel 309. Optical fiber channel 309 may be the same or similar to channel 109. As cantilevered end 350 extends from the end of optical fiber channel 309, cantilevered end 350 may curve away from a central axis 301.

Determining a degree of curvature of optical fiber 302 may be a useful diagnostic tool during alignment of optical fiber 302 with an external body. The optical fiber curvature measurement system described herein, such as optical fiber curvature measurement system 100A, may be used to measure the degree of curvature of optical fiber 302. Use of an optical fiber curvature measurement system, such as those described herein, allows for multiple images of the emission face end 354 of optical fiber 302 to be generated. As optical fiber 302 is rotated, emission face end 354 of optical fiber 302 precesses about the fixed central axis 301 of the rotation stage. A composite of multiple images can allow deflection, w, of optical fiber 302 to be calculated.

To determine a deflection, w, of cantilevered end 350, a length, L, of region 351 may be measured. The length, L of region 351 may be measured in a direction starting at an end 352 of optical fiber channel 309 and ending at a location along the x-axis where emission face end 354 of cantilevered end 350 is located. As cantilevered end 350 extends from optical fiber channel 309, optical fiber 302 may deflect away from central axis 301 of optical fiber 302. If optical fiber 302 was completely straight, thus having no curvature, optical fiber 302 would not deflect away from central axis 301 and would instead extend straight along the central axis 301.

The amount that cantilevered end 350 deflects away from central axis 301 may be the deflection, w, of optical fiber 302. Because of optical fiber channel 309, optical fiber 302 is collinear with central axis 301 at end 352. Due to internal thermal stress, optical fiber 302 curls in region 351 disposed between end 352 and emission face end 354. The deflection, w, is a function of x, with x being variable for the length, L, of optical fiber 302 between end 352 and emission face end 354. The deflection, w, may, in some embodiments, be dependent on the thermal stress and fiber diameter of optical fiber 302.

Figure 4:
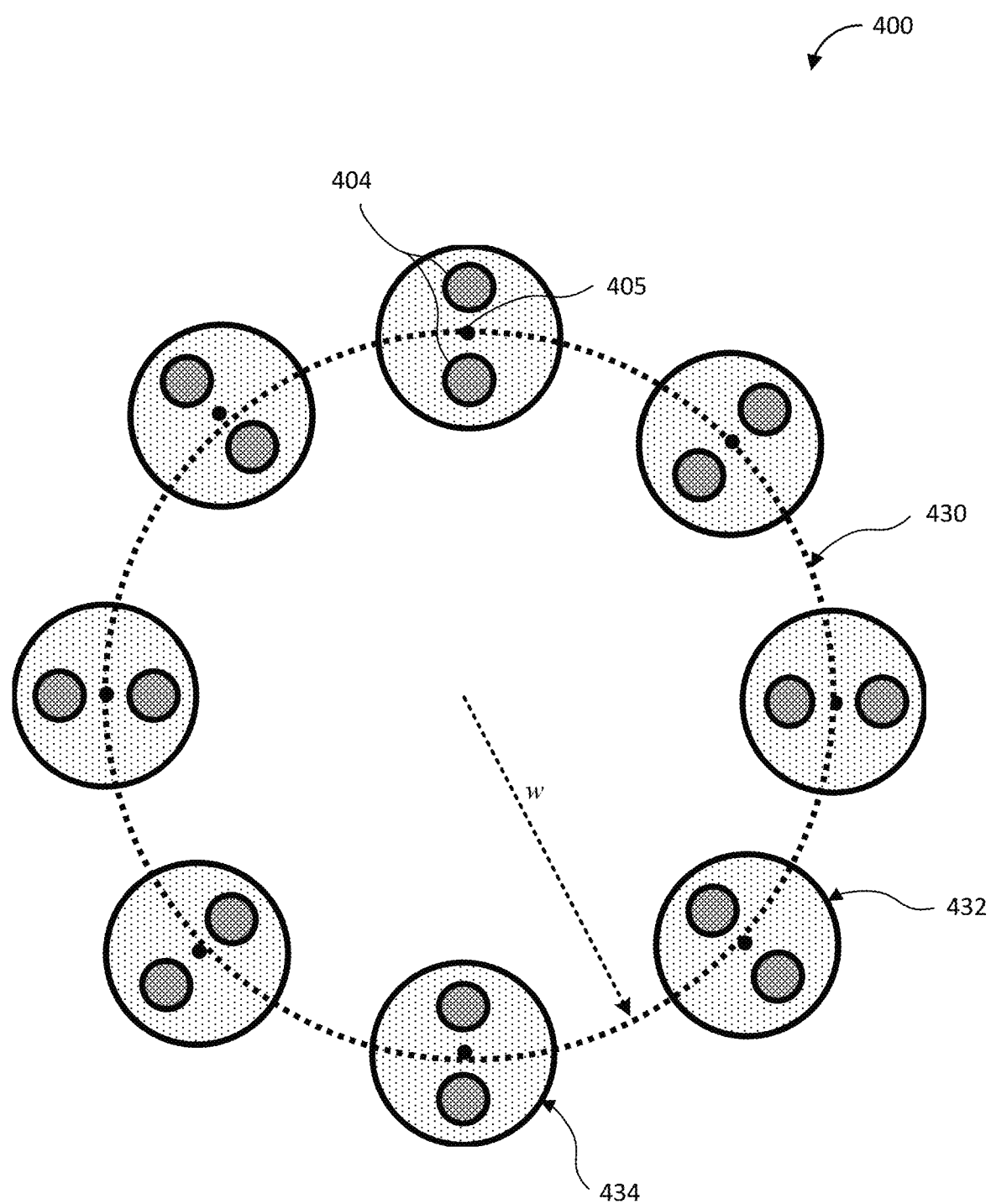
FIG. 4 is a diagram illustrating a set of images of an emission face of an optical fiber with curvature obtained using the optical fiber curvature measurement system illustrated in FIG. 1A.

A plurality of images of an emission face of optical fiber 302 may be generated to determine deflection, w. FIG. 4 is a diagram 400 illustrating a plurality of images of an emission face of an optical fiber with a curvature obtained using the optical fiber curvature measurement system illustrated in FIG. 1A. For ease of discussion, FIG. 4 may be described with respect to components of optical fiber curvature measurement system 100A of FIG. 1A.

Diagram 400 may depict a computational image computed based on images generated of the emission face of optical fiber 102 by image sensor 120. To generate diagram 400, optical fiber 102 may be disposed, using rotation stage 110 of optical fiber curvature measurement system 100A, at a series of different rotational positions. A first image 432 may be generated of the emission face of optical fiber 102 as illustrated in FIG. 1A in a first rotational position. Then, rotation stage 110 may rotate optical fiber 102 to a second rotational position and a second image 434 may be generated of the emission face of optical fiber 102 at the second rotational position.

Rotation of optical fiber 102 to different rotational positions, and imaging of an emission face at each rotational position, may be continued until a threshold number of images is generated. The threshold number of images may be determined based on whether the images generated form a pathway 430, or enough of a pathway 430 to determine deflection, w. Deflection, w, may be equal to a radius of pathway 430. As shown, each image of an emission face of optical fiber 102 may be located at a point along pathway 430. In some embodiments, such as in diagram 400, pathway 430 may be circular.

As shown in FIG. 4, each image of the emission face of optical fiber 102 may include stress rods 404 and core 405. The position of core 405 in each of the images may be used to determine pathway 430. For example, pathway 430 may align with core 405 shown in first image 432 and core 405 shown in second image 434. In other embodiments, stress rods 404 and/or another fixed point on the images may be used to determine pathway 430. Once pathway 430 is identified the radius of pathway 430, which is the same as deflection, w, may be determined.

Once the deflection, w, and length, L, for optical fiber 102 are determined, then the degree of curvature of optical fiber 102 can be fit to a mechanical curvature model. A standard metric for the curvature of an optical fiber is the radius of curvature, Rc. The radius of curvature, Rc, is the radius of a best fit circle to the curvature of the optical fiber. Typical values for the radius of curvature, Rc, may be on the order of meters, whereas, the length, L, may be on the order of millimeters and deflection, w, may be on the order of micrometers. By fitting the determined length, L, of the cantilevered portion of the optical fiber, and deflection, w, to a second order polynomial, the approximation, radius of curvature, Rc, for the curvature of the optical fiber may be calculated. The radius of curvature, Rc, may be calculated by the following equation:

$$R_c = \frac{L^2 + w^2}{2w}$$

In some embodiments, other mechanical models may be used to fit the fiber curvature. For example, multiple deflections, w, can be measured for multiple lengths, L, of optical fiber 102 so that the radius of curvature, Rc, may be fit in a least-squares model. In other embodiments, the radius of curvature, Rc, could be approximated based on a trigonometric model of the curvature of optical fiber 102. One of ordinary skill in the art would recognize many variations, modification, and alternatives.

Figure 5A:
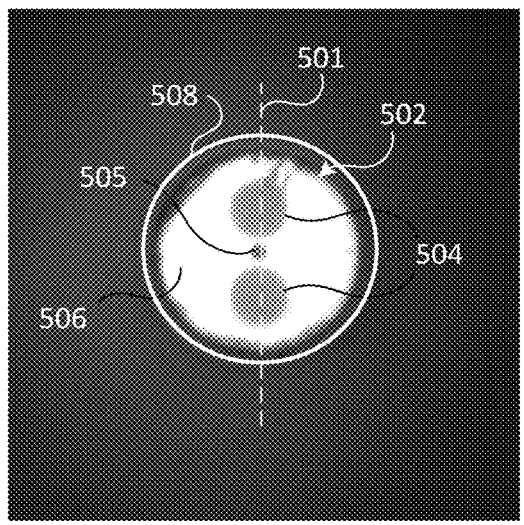
FIG. 5A is an exemplary first emission image depicting an optical fiber for determining a first rotation offset according to an embodiment of the present invention.

In some embodiments, the deflection, w, and thereby the radius of curvature, Rc, may be determined based on a rotational offset of an emission face of an optical fiber. Referring now to FIG. 5A an exemplary first emission image 500A depicting an emission face 502 for determining a first rotation offset according to an embodiment of the present invention. As shown, a first position 508 of emission face 502A may include the rotational offset of an optical fiber, such as the optical fiber 102. The axis 501 passing through stress rods 504 and core 505 is oriented vertically with respect to the vertical axis and the degree to which the axis 501 tilts from the vertical axis is characterized as a rotational offset.

Figure 5B:
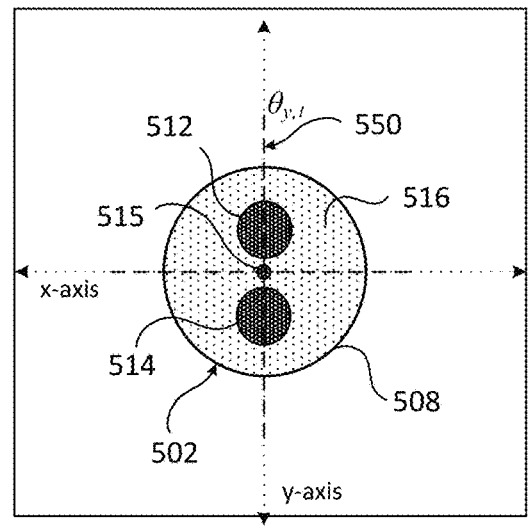
FIG. 5B is a diagram illustrating a computational image used to calculate the first rotation offset of the optical fiber illustrated in FIG. 5A.

FIG. 5B is a diagram illustrating a computational image 500B used to calculate the rotational offset of the emission face 502 imaged in FIG. 5A. To calculate the rotational offset of emission face 502, computational image 500B may be generated based on emission image 500A. One of several image processing methods can be utilized to detect and/or identify the various components of the optical fiber. In some embodiments, the various components of the optical fiber can be identified based on pixel coordinates within image 500A. Thus, computational image 500B may include regions associated with stress rods 504 and core 505. To identify stress rods 504 and core 505, a first region 512 and a second region 514 may be identified in emission image 500A. First region 512 and second region 514 may be identified by a grey-scale or color difference between stress rods 504 and cladding 506 within emission image 500A. Similarly, core 505 may be identified within emission image 500A by a grey-scale or color difference with cladding 506. As will be evident to one of skill in the art, the geometrical structures present in emission face 502 may be utilized as part of the image processing techniques. Thus, for the illustrated optical fiber, the circular cross-sectional shape of the core, stress rods, and cladding can be utilized in identifying these structures.

Once first region 512 and second region 514 are identified, vertical and horizontal x-y coordinates for first region 512 and second region 514 may be determined. Vertical and horizontal x-y coordinates may also be determined for central region 515, corresponding to core 505, and general region 516, corresponding to cladding 506. Computational image 500B may be generated based on the vertical and horizontal x-y coordinates.

A degree of rotational offset may be calculated for first region 512 and second region 514. To calculate the degree of rotational offset, a first vertical rotation offset, $\theta_{y,1}$, may be determined from both first region 512 and second region 514. The first vertical rotation offset, $\theta_{y,1}$, may be determined by identifying a vertical offset axis 550. Vertical offset axis 550 may be determined by aligning the center of first region 512, second region 514, and central region 515. The first vertical rotation offset, $\theta_{y,1}$, may be determined by comparing vertical offset axis 550 to the vertical y-axis. The degree to which vertical offset axis 550 is rotated from the vertical y-axis may be the first vertical rotation offset, $\theta_{y,1}$. Using the vertical rotation offset, $\theta_y$, the degree of rotational offset may be determined from first region 512 and second region 514. The rotational offset may be determined based on the degree of rotational offset of emission face 502.

Figure 5C:
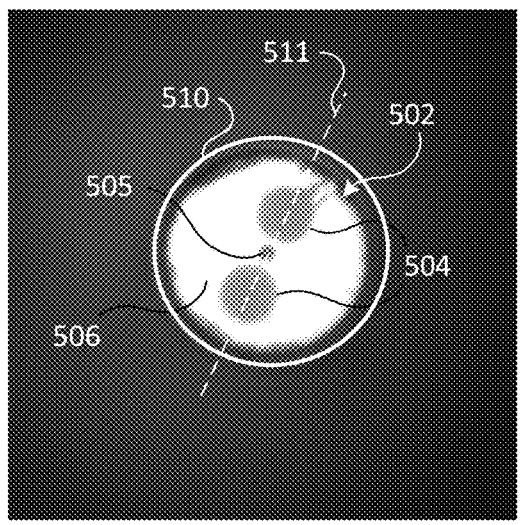
FIG. 5C is an exemplary second emission image depicting the optical fiber of FIG. 5A after rotation to a second position according to an embodiment of the present invention.

To determine a deflection, w, of the optical fiber corresponding to the emission face 502, the optical fiber may be rotated by a determined amount and a second image may be generated. FIG. 5C provides an exemplary second emission image depicting the optical fiber of FIG. 5A after rotation to a second position 510 according to an embodiment of the present invention. In FIG. 5C, an exemplary second emission image 500C is shown depicting the optical fiber of FIG. 5A after rotation to a second position 510 using the optical fiber curvature measurement system illustrated in FIGS. 1A-E. As shown in FIG. 5C, exemplary second emission image 500C depicts emission face 502 of FIG. 5A after rotation to second position 510. Second position 510 can include an axis 511 that aligns core 505 and stress rods 504. Axis 511 may be the same as axis 501 except that it is rotated by one or more degrees. The degree to which the optical fiber is rotated may be known.

In this scenario, rotating the emission face 502 to the second position 510 may include rotating the axis 501 by approximately 30 degrees. The axis 511 passing through stress rods 504 and core 505 is tilted with respect to the vertical axis and the degree of this tilt is characterized as a rotational offset. Similar to emission image 500A, emission image 500C depicts emission face 502 along with stress rods 504, core 505, and cladding 506. The orientation, however, of stress rods 504, core 505, and cladding 506 depicted in emission image 500C may be different than in emission image 500A. In particular, the emission image 500C demonstrates that axis 511 through stress rods 504 has been rotated by approximately 30 degrees.

Figure 5D:
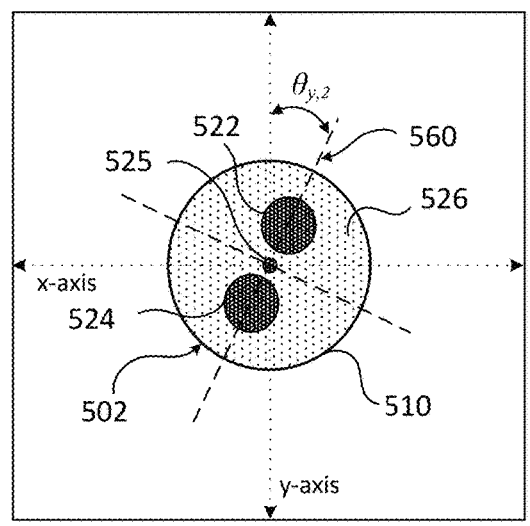
FIG. 5D is a diagram illustrating a computational image used to determine a second vertical rotation offset for the emission face of the optical fiber illustrated in FIG. 5A.

FIG. 5D is a diagram illustrating a computational image 500D used to determine a second vertical rotation offset for emission face 502 illustrated in FIG. 5A. Computational image 500D may be generated based on computational image 500B. Specifically, computational image 500D may be generated based on first position 508. To generate computational image 500D, second position 510 may be identified. As noted above, second position 510 may include axis 511. In some examples, second position 510 may be identified based on pixels within emission image 500A.

As shown, computational image 500D may include a first region 522 and a second region 524 that correspond to stress rods 504 in the rotated position. Computational image 500D may also include a core 525 and a cladding 526 corresponding to core 505 and cladding 506 in the rotated position. Similar to computational image 500B, computational image 500D may include have a second vertical rotation offset, $\theta_{y,2}$, identified from first region 522 and second region 524. When the center of first region 522, second region 524, and core 525 are aligned to identify a vertical offset axis 560, vertical offset axis 560 may be used to identify the second rotation offset, $\theta_{y,2}$. Axis 511, and thus second position 510, may be identified based on vertical offset axis 560.

The rotational offset may be used to determine a deflection, w, of an optical fiber. For example, if the emission face 502 of the optical fiber has a first vertical rotation offset, $\theta_{y,1}$, in the first image 500A and a second vertical rotation offset, $\theta_{y,1}$, in the second image 500C, than the difference between the first rotation offset, $\theta_{y,1}$, and the second vertical rotation offset $\theta_{y,2}$, may be used to calculate the deflection, w, of the emission face 502. For example, the degree or amount that the vertical axis of the emission face 502 changes from vertical axis 550 to the vertical axis 560 may correspond to the amount that the optical fiber has been rotated between the first position 508 to the second position 510. From there, as discussed with respect to FIG. 4, a pathway for the circular arc formed by rotating the optical fiber, such as the pathway 430, may be determined and thereby the deflection, w, of the optical fiber may be determined. As discussed above, once the deflection, w, is determined, then the radius of curvature, Rc, for the optical fiber may be determined.

Figure 6:
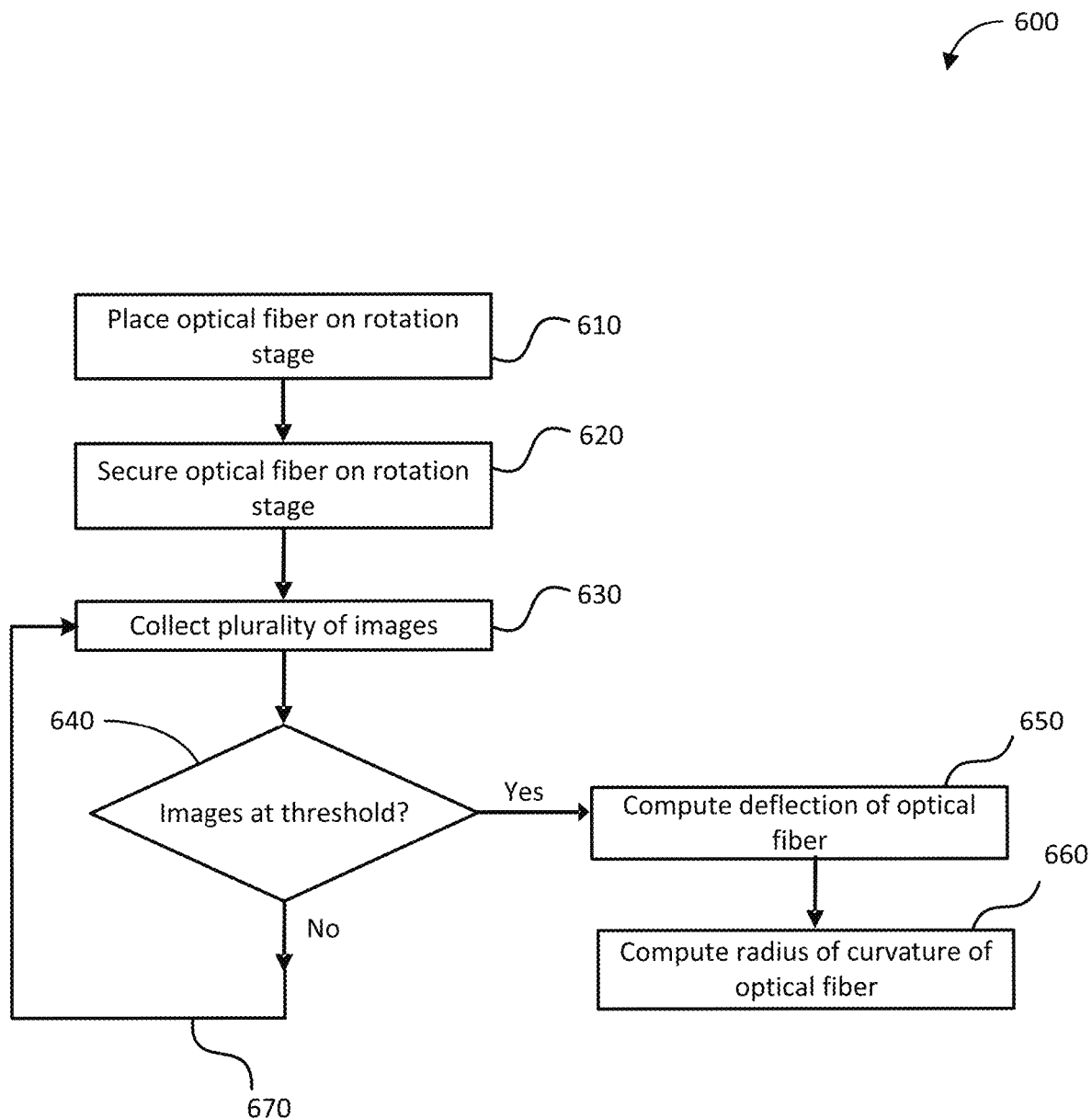
FIG. 6 is a simplified flowchart illustrating a method of measuring curvature in an optical fiber according to an embodiment of the present invention.

FIG. 6 is a simplified flowchart illustrating a method 600 of measuring curvature in an optical fiber according to an embodiment of the present invention. For ease of discussion, method 600 is described with reference to elements of FIGS. 1A-E, however, it will be appreciated that the use of method 600 is not limited to the particular optical fiber curvature measurement system illustrated in FIGS. 1A-E.

The method includes placing an optical fiber on a rotation stage (610). The optical fiber may include a cantilevered end. Referring to FIG. 1A, optical fiber 102 can be placed on rotation stage 110, for example, disposing optical fiber 102 in a channel 109 of rotation stage 110. Optical fiber 102 may include cantilevered end 150. The method also includes securing the optical fiber with respect to the rotation stage (620). In some embodiments, securing the optical fiber on the rotation stage may include contacting the optical fiber with a vacuum chuck, and inducing a vacuum on the optical fiber using the vacuum chuck. For example, referring to FIG. 1A, securing optical fiber 102 in place with respect to rotation stage 110 may include contacting a portion 113 of optical fiber 102 with a static immobilizer 112 being a vacuum chuck and inducing a vacuum on optical fiber 102 using the vacuum chuck.

The method also includes collecting a plurality of images (630). Each of the plurality of images may be associated with a different rotational position of the cantilevered end of the optical fiber. With reference to FIGS. 1A-E, for example, a plurality of images of cantilevered end 150 of optical fiber 102 may be collected by image sensor 120 at different rotational positions as rotation stage 110 rotates optical fiber 102.

In some embodiments, collecting the plurality of images may include illuminating the optical fiber on the rotation stage, generating a first image of an emission face of the cantilevered end of the optical fiber, and generating a second image of the emission face of the cantilevered end of the optical fiber. For example, illuminating the optical fiber on the rotation stage may include emitting light onto the optical fiber at an oblique angle from the optical fiber. For example, with reference to FIGS. 1A-E, optical fiber 102 may be illuminated by a light source 130 on rotation stage 110. In some embodiments, illuminating optical fiber 102 may include emitting light onto optical fiber 102 at an oblique angle from optical fiber 102.

In some embodiments, generating the first image of the emission face of the cantilevered end of the optical fiber and generating the second image of the emission face of the cantilevered end of the optical fiber may include generating the first image of the emission face of the cantilevered end of the optical fiber in a first rotational position, rotating the optical fiber to a second rotational position, and generating the second image of the emission face of the cantilevered end of the optical fiber in the second rotational position. For example, with reference to FIGS. 1A-E, image sensor 120 may generate a first image of an emission face of cantilevered end 150 of optical fiber 102 at a first rotational position. Then, rotation stage 110 may rotate optical fiber 102 such that cantilevered end 150 is in a second rotational position. Image sensor 120 may then generate a second image of the emission face of cantilevered end 150 of optical fiber 102 at the second rotational position.

Optionally, the method includes generating a third image of the emission face of the cantilevered end of the optical fiber in a third rotational position. With reference to FIGS. 1A-E, in such cases, image sensor 120 may generate a third image of the emission face of cantilevered end 150 of optical fiber 102 in a third rotational position.

The method includes determining that the plurality of images is at a threshold number of images (640). For example, a number of the plurality of images may be determined. As described above, a computational image of the collected images may be generated and a pathway based on the plurality of images may be identified. A certain number of images may be required to identify the pathway. Accordingly, it may be determined whether enough images have been collected to identify the pathway for the optical fiber as it is rotated.

If it is determined that the number of the plurality of images is below a threshold number of images, the method includes rotating the optical fiber on the rotation stage to a next position and obtaining another image of the cantilevered end of the optical fiber in the next position. In some embodiments, prior to rotating the optical fiber on the rotation stage to the rotated position, the method comprises releasing the optical fiber. With reference to FIGS. 1A-E, prior to rotating optical fiber 102 on rotation stage 110, optical fiber may be released. Releasing optical fiber 102 may include, for example, releasing a vacuum applied by a vacuum chuck onto optical fiber 102. In some embodiments, prior to rotating optical fiber 102, optical fiber 102 may be secured for rotation via a mechanical immobilizer. The mechanical immobilizer may secure optical fiber 102 onto rotation stage 110 during rotation.

Once the method determines that the plurality of images is at the threshold, the method includes computing a deflection of the cantilevered end of the optical fiber based on the plurality of images (650). The method also includes computing a radius of curvature of the optical fiber based on the deflection of the cantilevered end of the optical fiber (660). In some embodiments, computing the radius of curvature of the optical fiber includes determining a cantilevered length of the cantilevered end of the optical fiber. In some cases, the elements of the method may iteratively repeat, collecting a new image at each iteration, until the threshold number of images is met (670).

It should be appreciated that the specific steps illustrated in FIG. 6 provide a particular method of 600 according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
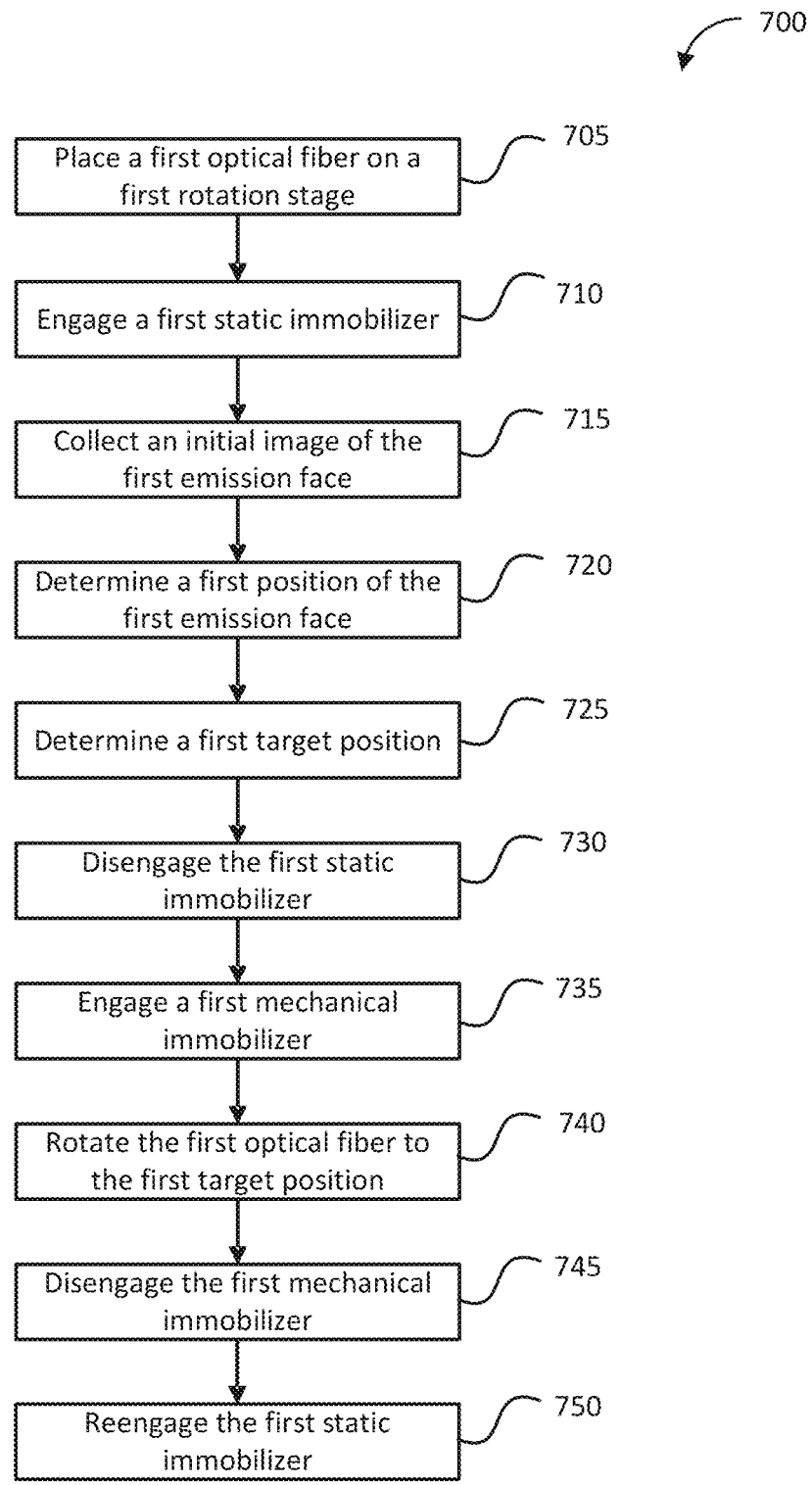
FIG. 7 is a simplified flowchart illustrating a method of aligning an optical fiber according to an embodiment of the present invention

In some embodiments, the curvature of an optical fiber may be used for alignment and splicing processes. For example, once the curvature of the optical fiber is determined, the optical fiber may then be aligned with an optical element, such as another optical fiber. FIG. 7 provides a simplified flowchart illustrating a method 700 of aligning an optical fiber according to an embodiment of the present invention. For ease of discussion, method 700 is described with reference to elements of FIGS. 1A-E, however, it will be appreciated that the use of method 700 is not limited to the particular optical fiber curvature system illustrated in FIGS. 1A-E.

The method includes placing a first optical fiber on a first rotation stage (705). For example, optical fiber 102 may be placed on rotation stage 110, as described with respect to FIGS. 1A-E. The method also includes engaging a first static immobilizer to secure the first optical fiber on the first rotation stage (710). For example, the portion 107 of optical fiber 102 may be contacted by static immobilizer 112 and when engaged, static immobilizer 112 may secure portion 107 of optical fiber 102 in place. In some embodiments, the first static immobilizer may be a vacuum chuck and engaging the first static immobilizer may include inducing a vacuum on the first optical fiber using the vacuum chuck.

The method includes collecting an initial image of a first emission face of the first optical fiber (715). With reference to FIGS. 1A-E, an initial image of a first emission face of first optical fiber 102 may be collected using image sensor 120.

The method also includes determining, based on the initial image, a first position of the first emission face (720). Based on the first position, a first target position for the first emission face may be determined (725). The first target position may correspond to alignment of the optical fiber with the optical element. The method includes disengaging the first static immobilizer to release the first optical fiber (730). As noted above, the first static immobilizer may be a vacuum chuck and disengaging the first static immobilizer may include releasing the vacuum applied to the first optical fiber by the vacuum chuck.

The method also includes engaging a first mechanical immobilizer to secure the first optical fiber during rotation (735). For example, with reference to FIGS. 1A-E, mechanical immobilizer 118 may contact portion 107 of optical fiber 102 to secure optical fiber 102 for rotation. In some embodiments, the first mechanical immobilizer may be engaged (735) prior to disengagement of the first static immobilizer (730). In other embodiments, the first mechanical immobilizer may be engaged (735) simultaneously or concurrently with disengagement of the first static immobilizer (730) in a single step.

Once the first mechanical immobilizer is engaged, the first optical fiber may be rotated to the first target position (740). With reference to FIGS. 1A-E, optical fiber 102 may be rotated using rotator assembly 114. Once the first optical fiber is rotated to the first target position, the method may also include disengaging the first mechanical immobilizer to release the first optical fiber (745).

Optionally, the method may include reengaging the first static immobilizer (750). In some embodiments, the first optical fiber may be further rotated to a second target position and thus the first static immobilizer may be reengaged before rotating the first optical fiber to the second target position. The second target position may be based on correcting alignment of the optical fiber with the optical element if the first target position does not provide appropriate alignment.

In other embodiments, rotation of the first optical fiber to the first target position may require an intermediate position placement of the first optical fiber. For example, the rotational offset of the first optical fiber may require rotation of 180°. To achieve rotation of 180°, the first optical fiber may be rotated 90° in a first step to an intermediate position. Once at intermediate position, the first mechanical immobilizer may disengage (745) and the first static immobilizer (750) may reengage. The rotation assembly may adjust back to a neutral position before reengaging the first mechanical immobilizer and disengaging the first static immobilizer for rotating the first optical fiber the additional 90° in a second step to the first target position to achieve the full 180° of rotation. In some embodiments, the rotation stage 110 may be pre-rotated while the optical fiber 102 is immobilized and then rotate the optical fiber 102 to the desired rotation angle such that rotation greater than 90° is achieved in a single step. As will be evident to one of skill in the art, the rotation step size does not need to be 90° and smaller step sizes may be utilized. Moreover, although two equal steps sizes of 90° are utilized in this example, this is not required and the step sizes may be unequal, summing to the desired total rotation angle. One of ordinary skill in the art would recognize many variations, modifications, and alternatives.

Embodiments of the present invention provide for accurate control of the orientation of the longitudinal axis of the optical fiber through the use of the first static immobilizer. As an example, after the first optical fiber is rotated to the first target position and the first mechanical immobilizer is disengaged to release the first optical fiber, the first static immobilizer can be reengaged, for example, by pulling a vacuum to position the first optical fiber in a v-groove extending along the length of the first static immobilizer. Accordingly, after rotation, the longitudinal axis of the first optical fiber is returned to the same position at which it was located prior to rotation.

In other embodiments, the optical element may be a second optical fiber. In such embodiments, the method may further include placing a second optical fiber on a second rotation stage, engaging a second static immobilizer to secure the second optical fiber on the second rotation stage, collecting the initial image, wherein the initial image comprises the first emission face of the first optical fiber and the second emission face of the second optical fiber, determining, based on the initial image, a second position of the second emission face, determining a second target position for the second emission face, disengaging the second static immobilizer to release the second optical fiber, engaging a second mechanical immobilizer to secure the second optical fiber during rotation, rotating the second optical fiber to the second target position, and disengaging the second mechanical immobilizer to release the second optical fiber.

In some embodiments, the method may further include engaging the first static immobilizer to secure the first optical fiber after rotation, collecting a second image of the first emission face, and determining a modified position of the first emission face. Optionally, the method may include determining that the modified position of the first emission face is within a threshold area of the first target position, and disengaging the first static immobilizer to release the first optical fiber.

It should be appreciated that the specific steps illustrated in FIG. 7 provide a particular method of aligning an optical fiber according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

The examples and embodiments described herein are for illustrative purposes only. Various modifications or changes in light thereof will be apparent to persons skilled in the art. These are to be included within the spirit and purview of this application, and the scope of the appended claims, which follow.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is an optical fiber curvature measurement system comprising: a controller; a rotation stage comprising a central axis, a first end, and a second end, wherein the central axis extends from the first end to the second end of the rotation stage, wherein the rotation stage: further comprises an optical fiber channel, wherein the optical fiber channel extends from the first end of the rotation stage to the second end of the rotation stage; is operationally coupled with the controller; and is configured to rotate about the central axis of the rotation stage; an optical fiber positioned within the optical fiber channel, wherein the optical fiber comprises a cantilevered end which extends out from the second end of the rotation stage; a light source positioned to emit light onto the optical fiber channel at an oblique angle from the central axis of the rotation stage; and an image sensor positioned adjacent to the second end of the rotation stage, wherein the image sensor is: positioned to generate an initial image of the cantilevered end of the optical fiber disposed within the optical fiber channel; and operationally coupled with the controller.

Example 2 is the optical fiber curvature measurement system of any previous or subsequent example further comprising a static immobilizer, wherein the static immobilizer is in contact with a portion of the optical fiber and is configured to secure the optical fiber onto the rotation stage.

Example 3 is the optical fiber curvature measurement system of any previous or subsequent example wherein the static immobilizer is positioned between the rotation stage and the image sensor.

Example 4 is the optical fiber curvature measurement system of any previous or subsequent example wherein the static immobilizer comprises a vacuum chuck.

Example 5 is the optical fiber curvature measurement system of any previous or subsequent example wherein the rotation stage comprises a drive assembly and a rotator assembly.

Example 6 is the optical fiber curvature measurement system of any previous or subsequent example further comprising a mechanical immobilizer, wherein the mechanical immobilizer is configured to secure the optical fiber when the rotation stage rotates about the central axis of the rotation stage.

Example 7 is the optical fiber curvature measurement system of any previous or subsequent example wherein the mechanical immobilizer comprises two pads positioned on either side of the optical fiber channel and configured to contact the optical fiber when positioned in the optical fiber channel.

Example 8 is the optical fiber curvature measurement system of any previous or subsequent example wherein the mechanical immobilizer is positioned between the rotation stage and the static immobilizer.

Example 9 is the optical fiber curvature measurement system of any previous or subsequent example wherein the oblique angle is less than 90° from the central axis of the rotation stage.

Example 10 is the optical fiber curvature measurement system of any previous or subsequent example further comprising the optical fiber comprises one or more stress rods.

Example 11 is a method of determining a curvature of an optical fiber, the method comprising: placing an optical fiber on a rotation stage, wherein the optical fiber comprises a cantilevered end; securing the optical fiber on the rotation stage; collecting a plurality of images, wherein each of the plurality of images is associated with a different rotational position of the cantilevered end of the optical fiber; determining that the plurality of images is at a threshold; computing a deflection of the cantilevered end of the optical fiber based on the plurality of images is associated with a different rotational position of the cantilevered end of the optical fiber; and computing a radius of curvature of the optical fiber based on the deflection of the cantilevered end of the optical fiber.

Example 12 is the method of determining the curvature of the optical fiber of any previous or subsequent example wherein computing the radius of curvature of the optical fiber comprises: determining a cantilevered length of the cantilevered end of the optical fiber.

Example 13 is the method of determining the curvature of the optical fiber of any previous or subsequent example wherein collecting the plurality of images comprises: illuminating the optical fiber on the rotation stage; generating a first image of an emission face of the cantilevered end of the optical fiber; and generating a second image of the emission face of the cantilevered end of the optical fiber.

Example 14 is the method of determining the curvature of the optical fiber of any previous or subsequent example wherein generating the first image of the emission face of the cantilevered end of the optical fiber and generating the second image of the emission face of the cantilevered end of the optical fiber comprises: generating the first image of the emission face of the cantilevered end of the optical fiber in a first rotational position; rotating the optical fiber to a second rotational position; and generating the second image of the emission face of the cantilevered end of the optical fiber in the second rotational position.

Example 15 is the method of determining the curvature of the optical fiber of any previous or subsequent example further comprising generating a third image of the emission face of the cantilevered end of the optical fiber in a third rotational position.

Example 16 is the method of determining the curvature of the optical fiber of any previous or subsequent example wherein illuminating the optical fiber on the rotation stage comprises emitting light onto the optical fiber at an oblique angle from the optical fiber.

Example 17 is the method of determining the curvature of the optical fiber of any previous or subsequent example further comprising: determining that a number of the plurality of images is below a threshold number of images; rotating the optical fiber on the rotation stage to a next position; and collecting another image of the cantilevered end of the optical fiber in the next position.

Example 18 is the method of determining the curvature of the optical fiber of any previous or subsequent example wherein prior to computing the radius of curvature of the optical fiber based on the plurality of images, the method comprises determining that the number of the plurality of images is at the threshold number of images.

Example 19 is the method of determining the curvature of the optical fiber of any previous or subsequent example wherein prior to rotating the optical fiber on the rotation stage to the next position, the method comprises releasing the optical fiber.

Example 20 is the method of determining the curvature of the optical fiber of any previous or subsequent example wherein securing the optical fiber on the rotation stage comprises: contacting the optical fiber with a vacuum chuck; and inducing a vacuum on the optical fiber using the vacuum chuck.

What is claimed is:

1. An optical fiber curvature measurement system comprising:
   a controller;
   a rotation stage comprising a central axis, a first end, and a second end, wherein the central axis extends from the first end to the second end of the rotation stage, wherein the rotation stage:
      further comprises an optical fiber channel, wherein the optical fiber channel extends from the first end of the rotation stage to the second end of the rotation stage;
      is operationally coupled with the controller; and
      is configured to rotate about the central axis of the rotation stage;
   an optical fiber positioned within the optical fiber channel, wherein the optical fiber comprises a cantilevered end which extends out from the second end of the rotation stage;
   a light source positioned to emit light onto the optical fiber channel at an oblique angle from the central axis of the rotation stage, with the light at least partially coupled into the optical fiber; and
   an image sensor positioned adjacent to the second end of the rotation stage, wherein the image sensor is:
      positioned to generate an initial image of the cantilevered end of the optical fiber disposed within the optical fiber channel; and
      operationally coupled with the controller.

2. The optical fiber curvature measurement system of claim 1 further comprising a static immobilizer, wherein the static immobilizer is in contact with a portion of the optical fiber and is configured to secure the optical fiber onto the rotation stage.

3. The optical fiber curvature measurement system of claim 2 wherein the static immobilizer is positioned between the rotation stage and the image sensor.

4. The optical fiber curvature measurement system of claim 2 wherein the static immobilizer comprises a vacuum chuck.

5. The optical fiber curvature measurement system of claim 1 wherein the rotation stage comprises a drive assembly and a rotator assembly.

6. The optical fiber curvature measurement system of claim 2 further comprising a mechanical immobilizer, wherein the mechanical immobilizer is configured to secure the optical fiber when the rotation stage rotates about the central axis of the rotation stage.

7. The optical fiber curvature measurement system of claim 6 wherein the mechanical immobilizer comprises two pads positioned on either side of the optical fiber channel and configured to contact the optical fiber when positioned in the optical fiber channel.

8. The optical fiber curvature measurement system of claim 6 wherein the mechanical immobilizer is positioned between the rotation stage and the static immobilizer.

9. The optical fiber curvature measurement system of claim 1 wherein the oblique angle is less than 90° from the central axis of the rotation stage.

10. The optical fiber curvature measurement system of claim 1 wherein the optical fiber comprises one or more stress rods.

11. A method of determining a curvature of an optical fiber, the method comprising:
    placing an optical fiber on a rotation stage, wherein the optical fiber comprises a cantilevered end;
    securing the optical fiber on the rotation stage;
    collecting a plurality of images, wherein each of the plurality of images is associated with a different rotational position of the cantilevered end of the optical fiber, wherein collecting the plurality of images comprises illuminating the optical fiber on the rotation stage to couple at least partially light into the optical fiber;
    determining that the plurality of images is at a threshold;
    computing a deflection of the cantilevered end of the optical fiber based on the plurality of images associated with a different rotational position of the cantilevered end of the optical fiber; and
    computing a radius of curvature of the optical fiber based on the deflection of the cantilevered end of the optical fiber.

12. The method of determining the curvature of the optical fiber of claim 11 wherein computing the radius of curvature of the optical fiber comprises:
    determining a cantilevered length of the cantilevered end of the optical fiber.

13. The method of determining the curvature of the optical fiber of claim 11 wherein collecting the plurality of images further comprises:
    generating a first image of an emission face of the cantilevered end of the optical fiber; and
    generating a second image of the emission face of the cantilevered end of the optical fiber.

14. The method of determining the curvature of the optical fiber of claim 13 wherein generating the first image of the emission face of the cantilevered end of the optical fiber and generating the second image of the emission face of the cantilevered end of the optical fiber comprises:
    generating the first image of the emission face of the cantilevered end of the optical fiber in a first rotational position;
    rotating the optical fiber to a second rotational position; and
    generating the second image of the emission face of the cantilevered end of the optical fiber in the second rotational position.

15. The method of determining the curvature of the optical fiber of claim 14 further comprising generating a third image of the emission face of the cantilevered end of the optical fiber in a third rotational position.

16. The method of determining the curvature of the optical fiber of claim 13 wherein illuminating the optical fiber on the rotation stage comprises emitting light onto the optical fiber at an oblique angle from the optical fiber.

17. The method of determining the curvature of the optical fiber of claim 11 further comprising:
   determining that a number of the plurality of images is below a threshold number of images;
   rotating the optical fiber on the rotation stage to a next position; and
   collecting another image of the cantilevered end of the optical fiber in the next position.

18. The method of determining the curvature of the optical fiber of claim 17 wherein prior to computing the radius of curvature of the optical fiber based on the plurality of images, the method comprises determining that the number of the plurality of images is at the threshold number of images.

19. The method of determining the curvature of the optical fiber of claim 17 wherein prior to rotating the optical fiber on the rotation stage to the next position, the method comprises releasing the optical fiber.

20. The method of determining the curvature of the optical fiber of claim 11 wherein securing the optical fiber on the rotation stage comprises:
   contacting the optical fiber with a vacuum chuck; and
   inducing a vacuum on the optical fiber using the vacuum chuck.

* * * * *